(12) United States Patent
Deforet et al.

(10) Patent No.: US 11,319,081 B2
(45) Date of Patent: May 3, 2022

(54) MOUNTING PYLON FOR A JET ENGINE OF AN AIRCRAFT COMPRISING A PARTICULAR STRUCTURE

(71) Applicant: Airbus Operations SAS, Toulouse (FR)

(72) Inventors: Thomas Deforet, Toulouse (FR); Benoit Orteu, Toulouse (FR); Olivier Gleize, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 402 days.

(21) Appl. No.: 16/437,260

(22) Filed: Jun. 11, 2019

(65) Prior Publication Data

US 2020/0017227 A1 Jan. 16, 2020

(30) Foreign Application Priority Data

Jul. 12, 2018 (FR) ...................................... 1856425

(51) Int. Cl.
*B64D 27/26* (2006.01)
*B64D 27/18* (2006.01)

(52) U.S. Cl.
CPC ............. *B64D 27/26* (2013.01); *B64D 27/18* (2013.01); *B64D 2027/264* (2013.01); *B64D 2027/268* (2013.01)

(58) Field of Classification Search
CPC .. B64D 27/26; B64D 2027/264; B64D 27/18; B64D 2027/262; B64D 2027/266; B64D 2027/26
See application file for complete search history.

(56) References Cited

U.S. PATENT DOCUMENTS

| | | | |
|---|---|---|---|
| 2005/0274485 A1 | 12/2005 | Huggins et al. | |
| 2011/0121132 A1* | 5/2011 | Crook | B23P 15/008 244/54 |
| 2012/0056033 A1 | 3/2012 | Teulou et al. | |
| 2012/0104162 A1* | 5/2012 | West | B64C 1/1453 244/54 |
| 2016/0221682 A1 | 8/2016 | Pautis et al. | |
| 2017/0361940 A1 | 12/2017 | Bouchet et al. | |

FOREIGN PATENT DOCUMENTS

| | | |
|---|---|---|
| EP | 2426051 A1 | 3/2012 |
| FR | 2887522 A1 | 12/2006 |
| FR | 3032180 A1 | 8/2016 |
| FR | 3052745 A1 | 12/2017 |

OTHER PUBLICATIONS

French Search Report; priority document.

* cited by examiner

*Primary Examiner* — Richard R. Green
*Assistant Examiner* — Steven J Shur
(74) *Attorney, Agent, or Firm* — Greer, Burns & Crain, Ltd.

(57) ABSTRACT

A mounting pylon comprising a structure that comprises two C-shaped semi-structures and comprising an upper spar, a lower spar and a lateral flank, an upper panel, a lower panel, a reacting attachment point, two bars attached between the reacting attachment point and a jet engine, and a front wing attachment point attached to a wing box. The lateral flank comprises joists that are aligned between the front wing attachment point and the reacting attachment point, and where the angles between two successive joists are equal.

6 Claims, 3 Drawing Sheets

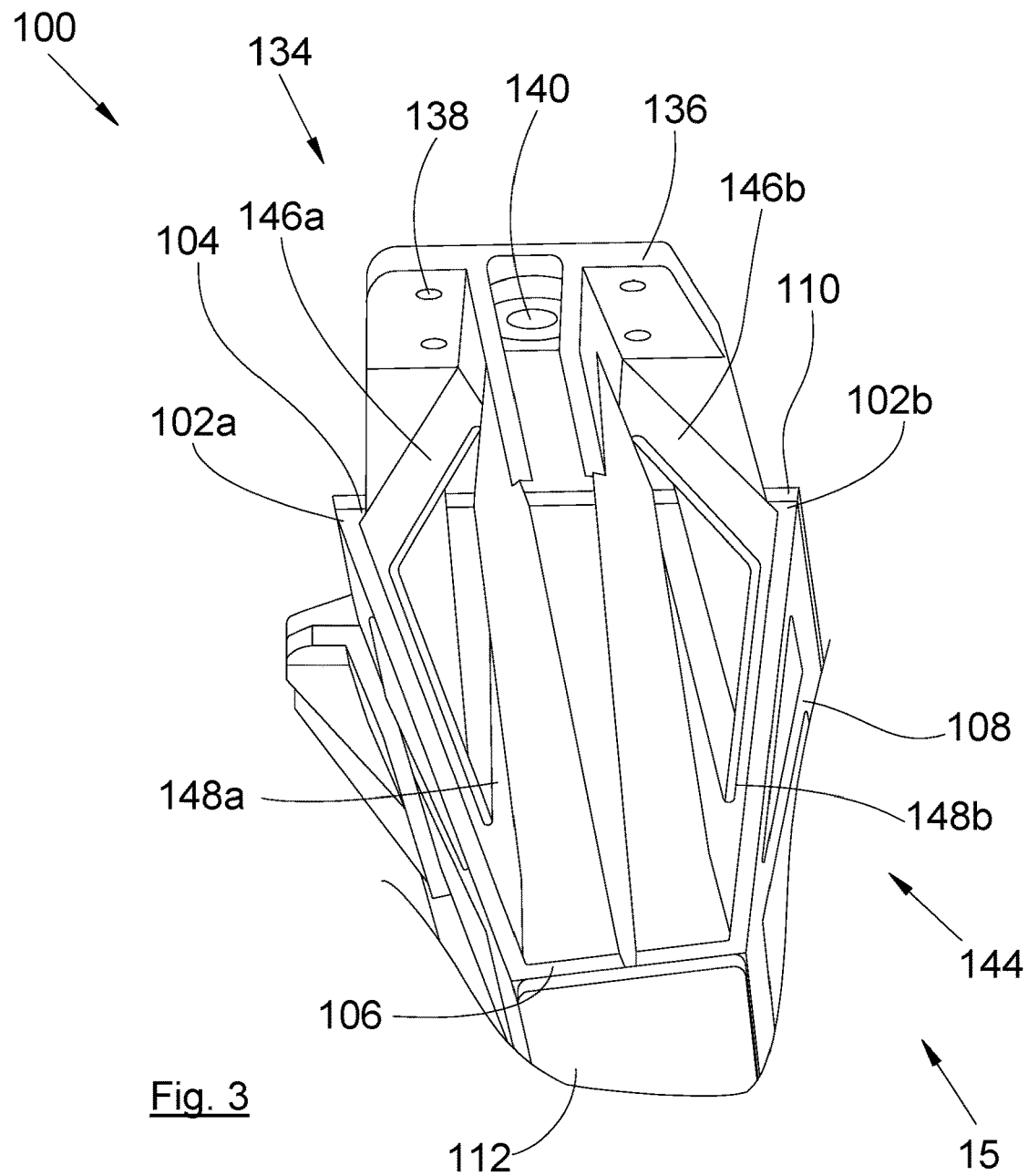
Fig. 3
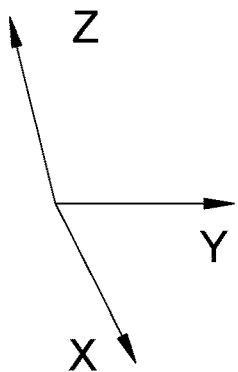

US 11,319,081 B2

MOUNTING PYLON FOR A JET ENGINE OF AN AIRCRAFT COMPRISING A PARTICULAR STRUCTURE

CROSS-REFERENCES TO RELATED APPLICATIONS

This application claims the benefit of the French patent application No. 1856425 filed on Jul. 12, 2018, the entire disclosures of which are incorporated herein by way of reference.

FIELD OF THE INVENTION

The present invention relates to a mounting pylon for a jet engine below the wing of an aircraft. It also relates to an aircraft equipped with a wing box, a jet engine and a mounting pylon of this type.

BACKGROUND OF THE INVENTION

In existing aircraft, the engines, such as jet engines, are hung below the wing using complex mounting devices, also referred to as EMS (engine mounting structure) or mounting pylon. The mounting pylons in normal use have a primary structure, also referred to as the rigid structure, which often takes the form of a box, that is to say, constructed by assembling upper and lower spars that are connected to one another by a plurality of transverse reinforcing ribs located inside the box and at the ends thereof. The spars are arranged at the lower and upper faces while lateral panels close the box to form lateral faces. Moreover, the mounting pylon is arranged at the top of the engine, between the engine and the wing box. This is referred to as a "12 o'clock" position.

As is known, the primary structure of these pylons is designed to allow transmission, to the wing, of the static and dynamic loads arising from the engines, such as weight and thrust but also the various dynamic loads, in particular those linked to fault events such as blade loss (FBO or "fan blade out"), nose gear collapse, dynamic landing, etc.

In mounting pylons known from the prior art, as in the document FR 2 887 522, the transmission of loads between its primary structure and the wing box is conventionally ensured by a set of attachment points comprising a front attachment point, a rear attachment point, and an intermediate attachment point, the latter being intended, in particular, to absorb the thrust loads generated by the engine. These attachment points are conventionally interposed vertically between the wing box and the primary structure of the mounting pylon.

Although mounting pylons of this kind are entirely satisfactory, it is desirable to identify an architecture that optimizes the load paths between the engine and the wing box.

SUMMARY OF THE INVENTION

One object of the present invention is to propose a mounting pylon, for a jet engine below the wing of an aircraft, which provides better transfer of loads between the jet engine and the wing box.

To that end, what is proposed is a pylon for mounting a jet engine to a wing box, said mounting pylon comprising a structure which comprises:

a port-side semi-structure and a starboard-side semi-structure, each in the form of a C-beam which is open towards the opening of the other semi-structure, and comprising an upper spar, a lower spar and a lateral flank which extends between the upper spar and the lower spar, an upper panel attached to the upper spars, a lower panel which is attached to the lower spars, a reacting attachment point attached below the lower panel, two bars, each having one end attached to the reacting attachment point and another end configured to attach to the jet engine, and a front wing attachment point configured to attach to the wing box, where the lateral flank comprises an openwork structure and comprises a reacting joist that extends in linear fashion between the upper spar and the lower spar and is oriented aligned between the front wing attachment point and the reacting attachment point, and where the lateral flank also comprises multiple transfer joists that extend in linear fashion between the upper spar and the lower spar, where the transfer joists are arranged one behind the other aft of the reacting joist, where each transfer joist is oriented aligned towards the front wing attachment point and where the angles between two successive joists are equal.

A mounting pylon of this type is therefore more lightweight and permits better transfer of loads along the joists.

Advantageously, the structure comprises a rear wing attachment point which is arranged to the rear of the mounting pylon and which comprises a sole configured to be attached to the wing box by means of multiple bolts and a shear pin, which are oriented parallel to a vertical direction Z, where the rear wing attachment point comprises a structural assembly comprising two upper beams and two lower beams, where at one end the beams are secured to one another and to the sole, where at another end each upper beam is secured to the same-side upper spar, and where at another end each lower beam is secured to the same-side lower spar.

Advantageously, the sole is generally coplanar with the front wing attachment point, the upper beams are generally horizontal and the lower beams are inclined from low to high when going from front to rear.

Advantageously, each joist is provided with ribs.

Advantageously, the upper spar and the lower spar are provided with ribs.

The invention also proposes an aircraft comprising a wing box, a jet engine and a mounting pylon according to one of the preceding variants, where the mounting pylon is attached to the wing box by the front wing attachment point and by the sole, and where the jet engine is attached to the mounting pylon by the two bars.

BRIEF DESCRIPTION OF THE DRAWINGS

The features of the invention mentioned above, along with others, will become more clearly apparent on reading the following description of one exemplary embodiment, said description being given with reference to the appended drawings, in which:

FIG. 3 shows a perspective view of the rear of the mounting pylon according to the invention, seen according to the arrow III of FIG. 2.

DETAILED DESCRIPTION OF THE PREFERRED EMBODIMENTS

Figure 1:
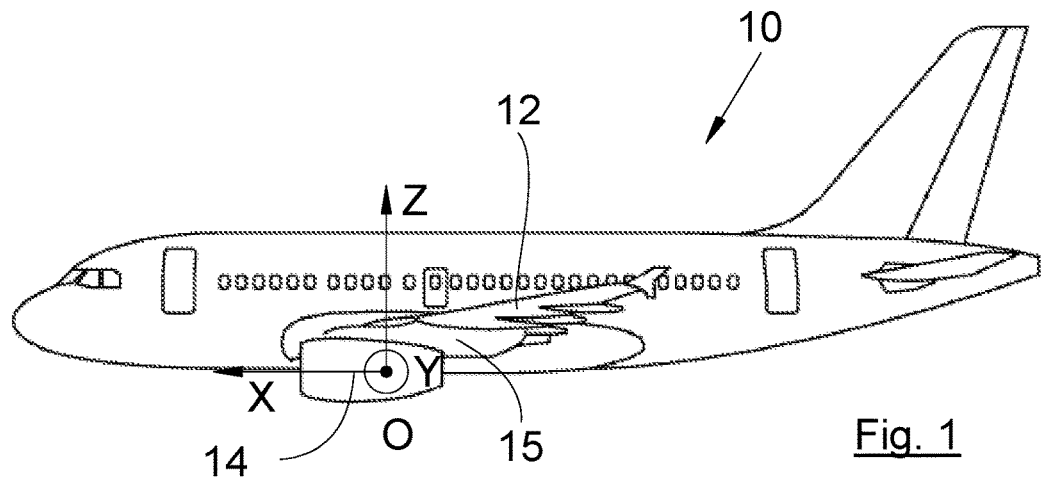
FIG. 1 shows a side view of an aircraft according to the invention.

FIG. 1 shows an aircraft 10 which has a wing 12 comprising a wing box, and below which is attached a mounting pylon 15 according to the invention and which in turn supports a jet engine 14.

By convention, X denotes the longitudinal direction of the jet engine 14, this direction X being parallel to a longitudinal axis of the aircraft 10. Moreover, Y denotes the transverse direction of the jet engine 14, this direction being horizontal when the aircraft is on the ground, and Z denotes the vertical direction or vertical height when the aircraft is on the ground, these three directions X, Y and Z being mutually orthogonal.

Figure 2:
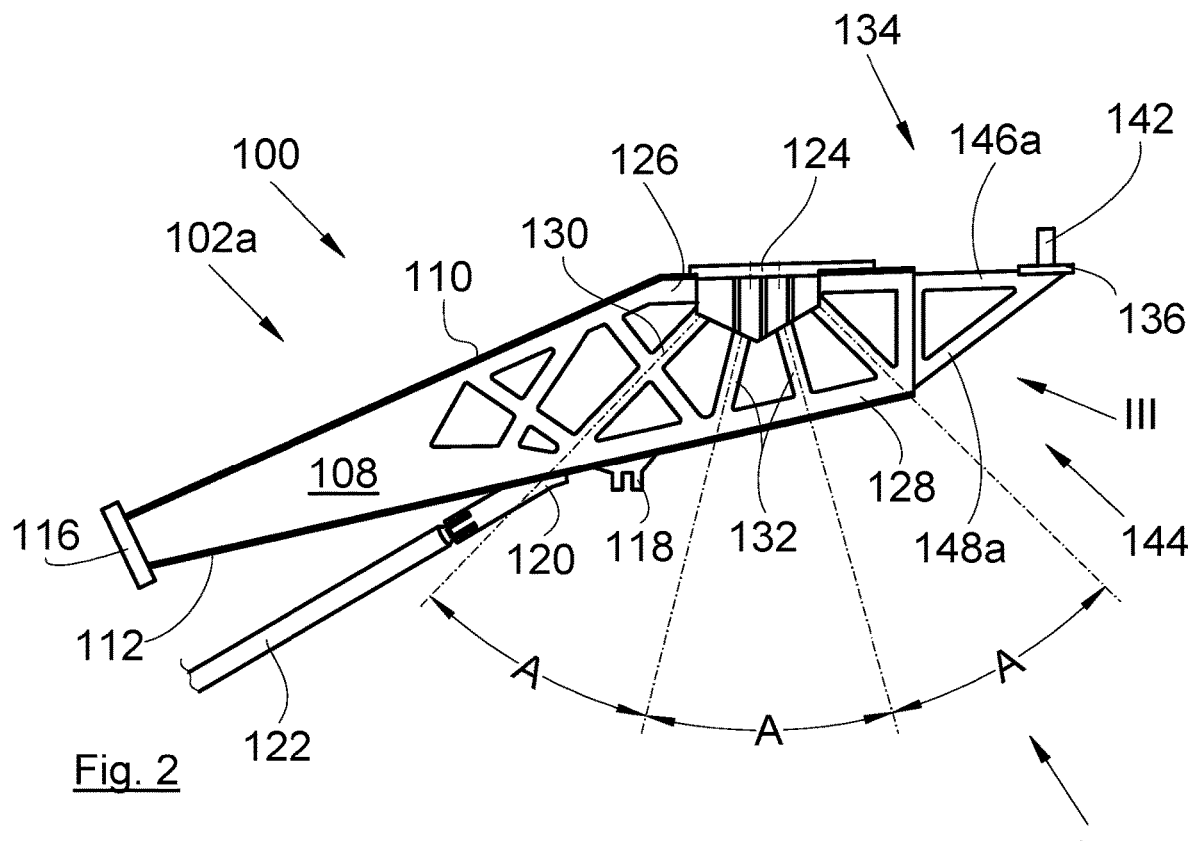
FIG. 2 shows a side view of a mounting pylon according to the invention.

FIG. 2 shows the mounting pylon 15, which has a structure 100. FIG. 3 shows the rear of the structure 100, FIG. 4 shows the structure 100, a portion of which has been omitted so as to make the interior visible, and FIG. 5 shows a detail of the structure 100.

The structure 100 comprises a port-side semi-structure 102a and a starboard-side semi-structure 102b.

Each semi-structure 102a-b is in the form of a C-beam which is open towards the opening of the other semi-structure 102b-a, as shown more clearly in FIG. 3. Each semi-structure 102a-b comprises an upper spar 126 in the form of an upper flange 104, and a lower spar 128 in the form of a lower flange 106, which are oriented generally in the transverse Y direction, and a lateral flank 108 which extends in a generally vertical plane between the upper spar 126 and the lower spar 128.

Figure 4:
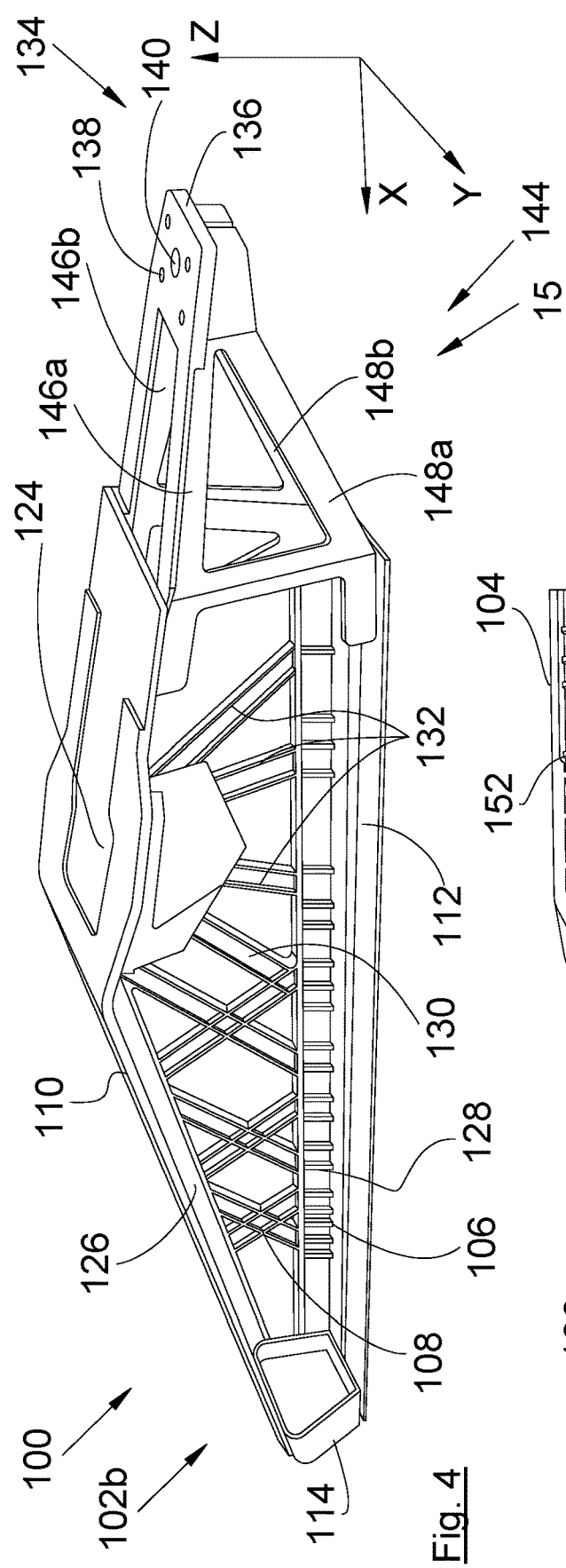
FIG. 4 shows a perspective side view of the mounting pylon according to the invention.
Figure 5:
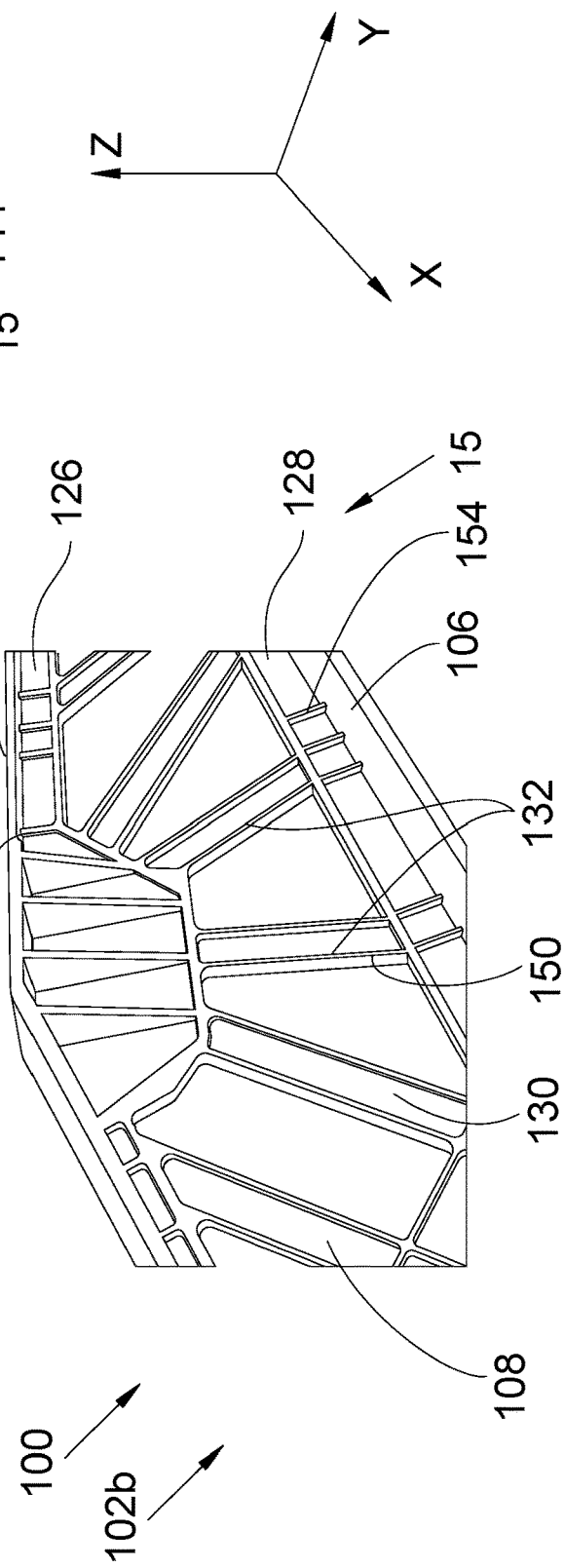
FIG. 5 shows a perspective view of a region of the mounting pylon according to the invention.

In FIG. 4, the port-side semi-structure 102a has been removed.

The structure 100 also comprises an upper panel 110 which is attached to the upper spars 126, for example by means of bolts or by welding.

The structure 100 also comprises a lower panel 112 which is attached to the lower spars 128, for example by means of bolts or by welding.

The upper spar 126 follows the upper panel 110 and the lower spar 128 follows the lower panel 112.

The assembly comprising the semi-structures 102a-b, the upper panel 110 and the lower panel 112 forms a box which is empty and thus more lightweight than the mounting pylons of the prior art.

The structure 100 also comprises a nose 114 which is arranged inside and at the front of the resulting box. Thus, the nose 114 is attached between the semi-structures 102a-b and the panels 110 and 112.

The structure 100 comprises, at the front of the nose 114, a front engine attachment point 116 which serves for attaching the jet engine 14, and more specifically the fan casing. This front engine attachment point 116 will be known to a person skilled in the art.

The structure 100 also comprises a rear engine attachment point 118 which is attached below the lower panel 112, at the general level of a median region of the structure 100 as seen in the longitudinal direction X. The rear engine attachment point 118 is attached to the jet engine 14, and more specifically to a central casing. This rear engine attachment point 118 will be known to a person skilled in the art and is, for example, in the form of two female devises.

The structure 100 also comprises a reacting attachment point 120 which is attached below the lower panel 112, at the general level of the median region, in front of the rear engine attachment point 118.

The structure 100 also comprises two bars 122, one end of each bar 122 being attached to the reacting attachment point 120. The bars 122 are arranged on either side of a longitudinal median XY plane of the mounting pylon 15. Each bar 122 is attached at one end to the reacting attachment point 120, and at the other end to a front portion of the central casing of the jet engine 14. These bars 122 serve, among other things, to react the thrust loads generated by the jet engine 14.

The structure 100 also comprises a front wing attachment point 124, which in this instance is an integral part of the upper panel 110 and by means of which the structure 100 can be attached to the wing box.

Each lateral flank 108 comprises an openwork structure and it comprises a reacting joist 130 that extends in linear fashion between the upper spar 126 and the lower spar 128 and is oriented aligned between the front wing attachment point 124 and the reacting attachment point 120. The loads transmitted by the bars 122 are split into a component in the lower spar 128 and a component in the reacting joist 130.

The lateral flank 108 also comprises multiple transfer joists 132, in this instance three, that extend in linear fashion between the upper spar 126 and the lower spar 128. The transfer joists 132 are arranged one behind the other aft of the reacting joist 130 and in the plane of the lateral flank 108. Each transfer joist 132 is oriented aligned towards the front wing attachment point 124 and the angles between two successive joists 130 and 132 are equal.

In other words, in the plane of the lateral flank 108, the angle between the reacting joist 130 and the first transfer joist 132 immediately behind is equal to A. The angle between the first transfer joist 132 and the second transfer joist 132 immediately behind is equal to A.

The angles are considered to be equal if they are within +/−10% with respect to an average angle that is preferably between 28° and 32°.

The angle is measured relative to the median line of each joist 130, 132.

Arranging the joists 130 and 132 as radii provides good load strength and a reduction in the weight of the mounting pylon 15. Loads are transmitted through each of the joists 130 and 132.

The structure 100 also comprises a rear wing attachment point 134 which is arranged at the rear of the mounting pylon 15, and by means of which the structure 100 can be attached to the wing box.

The rear wing attachment point 134 comprises a sole 136 that is attached to the wing box by means of a number of bolts (in this instance four) that are oriented parallel to the vertical direction Z. Each bolt is fixed in a bore 138 passing through the sole 136.

The rear wing attachment point 134 also comprises a shear pin 142 (or "spigot") arranged between the sole 136 and the wing box, and oriented parallel to the vertical direction Z. The shear pin 142 is fixed in a bore 140 passing through the sole 136. The shear pin 142 transmits the shear loads from the mounting pylon 15 to the wing box.

The rear wing attachment point 134 also comprises a structural assembly 144 comprising two upper beams 146a-b and two lower beams 148a-b. The two upper beams 146a-b are arranged on either side of the XZ median plane, and the two lower beams 148a-b are arranged on either side of the XZ median plane.

One end of each beam 146*a-b*, 148*a-b* is secured to the sole 136. At one end, the beams 146*a-b* and 148*a-b* are thus secured to one another and to the sole 136.

The other end of each upper beam 146*a-b* is secured to the upper spar 126 of the same-side semi-structure 102*a-b*.

The other end of each lower beam 148*a-b* is secured to the lower spar 128 of the same-side semi-structure 102*a-b*.

The beams 146*a-b* and 148*a-b* can be secured to the corresponding spars 126 and 128 by any appropriate means, such as by splice plates, by welding, etc. According to another embodiment, the beams 146*a-b* and 148*a-b* extend from the end of the spars 126 and 128, which are shaped to meet the sole 136.

The loads which are transmitted in the lower spar 128 are then transmitted in the sole 136 by the intermediary of the lower beams 148*a-b*.

A rear wing attachment point 134 of this kind makes it possible to react shear loads and replaces the solid lateral panels of the prior art by splitting the loads between the beams 146*a-b* and 148*a-b*.

The sole 136 is generally coplanar with the front wing attachment point 124, and the upper beams 146*a-b* are then generally horizontal and the lower beams 148*a-b* are inclined from low to high when going from front to rear.

In order to improve the rigidity of each semi-structure 102*a-b*, each joist 130, 132 is provided with ribs 150. Similarly, the upper spar 126 and the lower spar 128 are also provided with ribs 152, 154.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pylon for mounting a jet engine to a wing box, said mounting pylon comprising a structure which comprises:
   a port-side semi-structure and a starboard-side semi-structure, each formed as a C-beam open towards the opening of the other semi-structure, and comprising an upper spar, a lower spar and a lateral flank which extends between the upper spar and the lower spar,
   an upper panel attached to the upper spars,
   a lower panel attached to the lower spars,
   a reacting attachment point attached below the lower panel,
   two bars, each having one end attached to the reacting attachment point and another end configured to attach to the jet engine, and
   a front wing attachment point configured to attach to the wing box,
   wherein the lateral flank comprises an openwork structure and comprises a reacting joist that extends in linear fashion between the upper spar and the lower spar and is oriented aligned between the front wing attachment point and the reacting attachment point,
   wherein the lateral flank also comprises multiple transfer joists that extend in linear fashion between the upper spar and the lower spar,
   wherein the transfer joists are arranged one behind the other aft of the reacting joist,
   wherein each transfer joist is oriented aligned towards the front wing attachment point,
   wherein the angles between two successive joists are equal,
   wherein said structure comprises a rear wing attachment point arranged to a rear of the mounting pylon and comprises a sole configured to be attached to the wing box by means of multiple bolts and a shear pin, which are oriented parallel to a vertical direction Z,
   wherein the rear wing attachment point comprises a structural assembly comprising two upper beams and two lower beams,
   wherein, at one end, the upper and lower beams are secured to one another and to the sole,
   wherein, at another end, each upper beam is secured to the same-side upper spar, and
   wherein, at another end, each lower beam is secured to the same-side lower spar.

2. The mounting pylon according to claim 1, wherein the beams extend from an end of the spars which are shaped to meet the sole.

3. The mounting pylon according to claim 1,
   wherein the sole is generally coplanar with the front wing attachment point,
   wherein the upper beams are generally horizontal, and
   wherein the lower beams are inclined from low to high when going from front to rear.

4. The mounting pylon according to claim 1, wherein each joist is provided with ribs.

5. The mounting pylon according to claim 1, wherein the upper spar and the lower spar are provided with ribs.

6. An aircraft comprising
   a wing box,
   a jet engine, and
   a mounting pylon according to claim 1,
   wherein the mounting pylon is attached to the wing box by the front wing attachment point, and
   wherein the jet engine is attached to the mounting pylon by the two bars.

* * * * *